March 3, 1942.   W. DAEMEN   2,275,219
CIRCULAR SLIDE RULE
Filed July 7, 1939
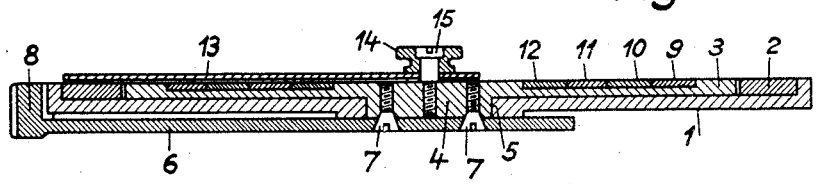
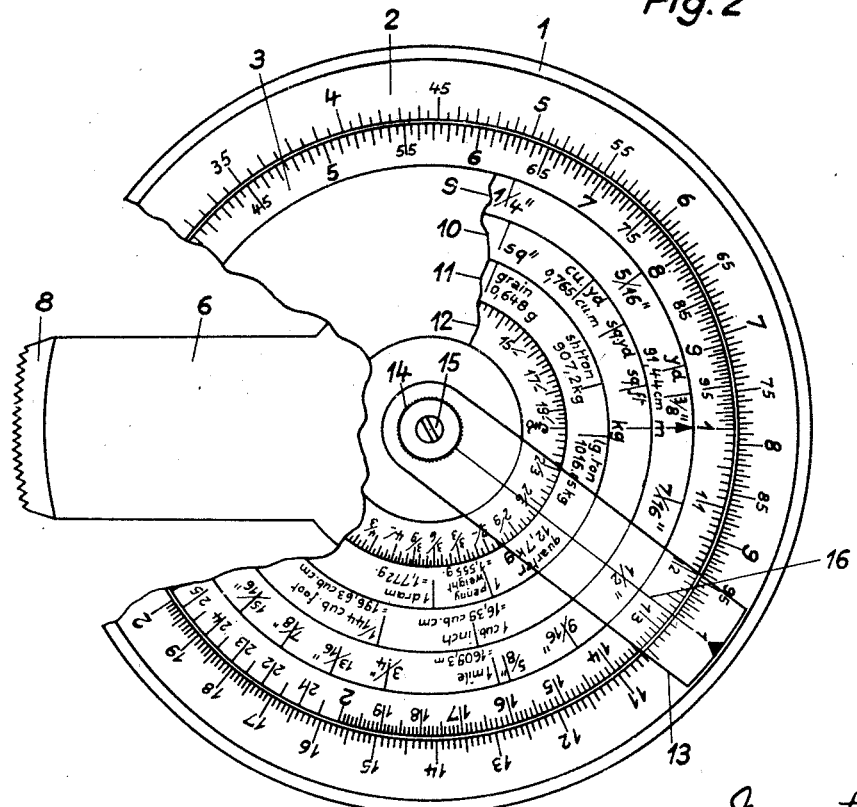
Inventor
Walter Daemen
By
Singer, Ehlert, Stern & Carlberg
attys.

Patented Mar. 3, 1942

2,275,219

UNITED STATES PATENT OFFICE 2,275,219

CIRCULAR SLIDE RULE

Walter Daemen, Uster, Switzerland

Application July 7, 1939, Serial No. 283,277

2 Claims. (Cl. 235—84)

Slide rules with two circular scales located in one plane, wherein the inner circular scale is located at the centre and is capable of being turned about its axis by a projecting knob, are known.

Two considerable disadvantages of this arrangement reside in the fact that the inner scale can only be adjusted by movement in stages and that the total height of these slide rules is relatively large by reason of the projection of the turning knob. The invention eliminates these two disadvantages by the use of a flat lever arm instead of the turning knob.

In addition to the outer fixed circular scale and the inner rotatable circular scale, as a corresponding logarithmic pair of scales, the vacant space on the inner movable circular scale can be provided with a number of exchangeable scale rings which are provided with graduations for the English and/or American measuring, weight and currency units or other suitable numerals for calculation, of which the position to the logarithmic main scale is determined by their value ratio to the decimal system.

These numerals for calculation may also be arranged on the rear side of the slide rule so that they can be so fixed by means of an index stroke of a transparent lever arm located on the rear side, that their decimal value can be transferred to the outer main scale on the front side.

In this case the calibration lines on the annular scales correspond to the outer fixed logarithmic scale on the front face of the computing disc. The transparent arm is mounted on the axis of the rotatable inner disc in such manner that its index line is located in that vertical plane which must be imagined as passing through the first index line of the inner logarithmic scale and is radially located. If, therefore, the index line of the arm is set to any one of the values on the back, the decimal value desired is directly opposite the initial or first index line of the inner rotatable logarithmic scale on the outer fixed logarithmic scale. According to the present invention, the transparent lever arm with the index line not only serves the function of the rotating lever or the function of a transparent marking element—it also serves the purpose of transferring at the same time the values on the back to that front face on which the computation is to be carried out, whereby those examples which are given below to show the computations also can be carried through.

An example of construction of the calculating device in accordance with the present invention is shown in the accompanying drawing, wherein:

Fig. 1 shows an axial section of the slide rule,

Fig. 2 is a plan view, wherein a substantial segmental section has been cut away so as to enable the turning lever arranged on the rear side to be seen.

To the base disc 1 there is rigidly secured the outer scale ring 2. The rotatable inner scale disc 3 engages with its hub 4 in a central opening 5, of the base disc 1. The turning lever 6 provided on the rear side of the slide rule, is rigidly connected by means of two screws 7 to the hub 4 of the rotatable scale disc 3. The lever 6 is provided at its outer end with a thickened milled edge 8 so that it can be more easily gripped with the fingers and turned and it is also made of transparent material and provided with an index line.

The inner scale 3 or the rear face of the base plate is provided with a number of exchangeably arranged circular ring scales 9, 10, 11 and 12, which are preferably differently coloured. The scale ring 9 is graduated with the English and American measurements of length, 10 with square and cubic measurements, 11 with weight units and 12 the English pound (money) divided into shillings and pence.

The different values can be set by means of the movable cursor 13, formed of transparent material, by turning it by means of the knob 14 about the fixed screw 15. The cursor 13 is provided with a hair line 16. The decimal value of the different values which have been set can then be read off on the scale 3 or multiplied or divided by means of the scale 3.

*Example of application 1*

1 quarter equals 12.7 kg. How many kg. are equal to 6 quarters (76.2 kg.)?

*Solution*

Place the hair line of the cursor 13 on 1 quarter (qr.) of the scale ring 11. On the scale 3 there is then the decimal value in kg. (equals 12.7 kg.). By turning the lever 6 move this value opposite the 1 point of the outer scale 2. Find the multiplier 6 on the scale 2 and read off the result (equals 76.2 kg.) underneath on the scale 3.

*Example of application 2*

1 yard (y) costs 2/6½d, what is the cost of 6 yards (15.3).

*Solution*

Place the hair line of the cursor 13 on 2/6½d of the English pound scale on 12. On the scale 3 there is then the value in decimal pounds (equal £0.127). By turning the lever 6 move the hair line of the cursor 13 opposite the 1 point of the outer scale 2. Find the multiplier 6 on scale 2 and read off the result in decimal pounds (equals 0.762) underneath on the scale 3. If the result is to be read off in English currency this will be found on the scale 12 (equals 15/3d).

What I claim is:

1. In a slide rule, a disc the front face of which is recessed, a second disc rotatably mounted in said recess with its exposed face flush with the exposed portion of the front face of the first disc, the exposed face of the first disc having an annular scale, the second disc having adjacent its periphery and on its exposed face an annular scale cooperative with the annular scale of the first disc, a cursor freely pivotally mounted at the axis of rotation of the second disc and overlying the exposed front faces of said discs and being provided with a hair line, the first disc having a central bearing opening and the second disc having a hub lying in said opening, and a lever lying against the back of the first disc and rigidly secured to said hub and projecting beyond the periphery of the first disc.

2. In a slide rule, a disc the front face of which is recessed, a second disc rotatably mounted in said recess with its exposed face flush with the exposed portion of the front face of the first disc, the exposed face of the first disc having an annular scale, the second disc having adjacent its periphery and on its exposed face an annular scale cooperative with the annular scale of the first disc, a cursor freely pivotally mounted at the axis of rotation of the second disc and overlying the exposed front faces of said discs and being provided with a hair line, the first disc having a central bearing opening and the second disc having a hub lying in said opening, and a lever lying against the back of the first disc and rigidly secured to said hub and projecting beyond the periphery of the first disc, said lever having its free end projected up to the plane of the front face of the first disc.

WALTER DAEMEN.